United States Patent [19]

Quirchmayr et al.

[11] Patent Number: 4,867,127
[45] Date of Patent: Sep. 19, 1989

[54] ARRANGEMENT FOR REGULATING THE COMBUSTION AIR PROPORTIONS

[75] Inventors: Gerhard Quirchmayr, Salzburg; Friedrich Gruber, Hippach; Stefan Knippitsch, Lofer, all of Austria

[73] Assignee: Jenbacher Werke Aktiengesellschaft, Jenbach, Austria

[21] Appl. No.: 124,941
[22] PCT Filed: Feb. 19, 1987
[86] PCT No.: PCT/AT87/00010
 § 371 Date: Oct. 27, 1987
 § 102(e) Date: Oct. 27, 1987
[87] PCT Pub. No.: WO87/05360
 PCT Pub. Date: Sep. 11, 1987

[30] Foreign Application Priority Data

Mar. 5, 1986 [AT] Austria .................................. 563/86

[51] Int. Cl.⁴ .......................................... F02B 43/00
[52] U.S. Cl. .................................... 123/527; 123/585; 123/438
[58] Field of Search ............... 123/527, 585, 588, 587, 123/436

[56] References Cited

U.S. PATENT DOCUMENTS

| 4,430,978 | 2/1984 | Lewis et al. | 123/527 |
| 4,446,940 | 5/1984 | Sakakibara | 180/177 |
| 4,537,172 | 8/1985 | Kanehara et al. | 123/527 |
| 4,617,904 | 10/1986 | Pagdin | 123/527 |
| 4,635,609 | 1/1987 | Seppen et al. | 123/527 |

FOREIGN PATENT DOCUMENTS

| 2020266 | 11/1971 | Fed. Rep. of Germany . |
| 2283315 | 3/1976 | France . |
| 2500061 | 8/1982 | France . |

Primary Examiner—E. Rollins Cross
Attorney, Agent, or Firm—Lorusso & Loud

[57] ABSTRACT

An arrangement for regulating the combustion air mixture in the case of a gas engine operating on a lean fuel, and in the induction line of which there is an air-gas mixer, a lambda regulator being provided and following which there is, for varying the combustion air proportions, a positioning device which adjusts the air-gas mixer, and also an output measuring device for ascertaining the engine output. A manometer determines the actual value of the mixture pressure upstream of the inlet valves of the engine, linked with the value for the combustion air proportions. By adjusting the combustion air proportions, it is possible to regulate the mixture pressure to the output dependent desired value for the mixture pressure as ascertained in a device within the lambda regulator.

13 Claims, 2 Drawing Sheets

ARRANGEMENT FOR REGULATING THE COMBUSTION AIR PROPORTIONS

BACKGROUND OF THE INVENTION

The invention relates to an arrangement for regulating the combustion air proportions also known as air to fuel ratio and designated by the greek letter lambda λ, in the case of a gas engine intended for lean mixture operation, in the induction line of which there is an air-gas mixer and possibly a mixture compressor, a lambda controller downstream of which, for varying the combustion air proportions, there is a positioning device for adjusting the air-gas mixer, and also an output measuring device for ascertaining the engine output.

Where gas engines are concerned, it is known to use exhaust gas catalysts in order to reduce the emission of harmful substances, particularly the components $NO_x$, CO and $C_nH_m$. When using a three-way catalyst to reduce the aforesaid harmful substance components $NO_x$, CO and $C_nH_m$, the gas engine is operated within the range of a combustion air ratio of λ=1, i.e. in the region of the stoichiometric combustion air ratio. In order to achieve a satisfactory conversion rate of the three-way catalyst for all three aforesaid harmful substance components and in order thus to achieve a reduction in the overall emission of pollutants, the combustion air proportion λ must be regulated and maintained within a very narrow range, the so-called lambda window. For example, this lambda window may lie in the range from 0.986 to 0.990. Only when the lambda value is within this narrow range is optimum operation of the three-way catalyst assured.

In the case of a known arrangement, regulation is effected via a zirconium dioxide probe which measures in the waste gas the $0_2$ partial pressure in relation to the $0_2$ partial pressure of the environmental air. Despite a temperature compensation of the regulator, the narrow prescribed lambda window can scarcely be maintained in practice. Above all in the event of fluctuations in the gas composition such as occur with dump gas, and the fluctuations in heating output which are connected therewith, it is impossible to achieve an optimum efficiency in the known waste gas catalyst which is regulated via a lambda probe.

Further disadvantages of any arrangement working with a threeway catalyst reside in that any pollutants occurring in the gas can rapidly damage the catalyst and the probe and in that the consumption of the gas engines is relatively high. Furthermore, there is a high thermal loading on the engine components.

These last-mentioned disadvantages can be prevented by operating the gas engine on a lean mixture, with which it is possible to avoid the use of a waste gas catalyst. Operating on a lean mixture generally means that the gas engine is operated on a mixture having an increased combustion air ratio (e.g. λ=1.3 to 1.7), in other words in which there is an excess of air over the stoichiometric quantity of air. When operating under such conditions, mainly the $NO_x$ pollutant components in the waste gas decrease rapidly with increasing λ. But also the CO and HC waste gas components are intensely reduced in comparison with λ=1 operation. In order to keep the $NO_x$ pollutant components in the waste gas below a required level (for example 500 mg/Nm3), therefore, it is necessary to operate with high combustion air ratios (e.g. λ=1.6). If the lambda values are too high (if the mixture is too lean), combustion failures can occur. Therefore, the value of the combustion air proportions must even with lean operation, be kept within a lambda range, the bottom limit of which is determined by the required $NO_x$ pollutant emission and of which the upper limit represents the stalling limit.

The advantage over the narrow lambda window in the case of three-way catalysts, which lies within the region of the stoichiometric lambda value, resides in that the above-defined lambda range is with lean operation substantially wider (by factor of 20 or more) than the required lambda window for a three-way catalyst.

Typical widths of lambda range lie within the range from $\Delta\lambda \approx 0.1$, both the upper stalling limit and also the lower $NO_x$ pollutant emission limit falling with diminishing gas engine output. The location of the required lambda range and thus the desired value of the combustion air ratio which is established substantially in the middle of the lambda range will therefore vary as a function of the engine output. The width of the lambda range certainly reamins substantially constant over the engine output.

By reason of varying marginal conditions, the combustion air proportions λ can for all identically adjusted air gas mixtures be displaced so that even under conditions of lean operation, a lambda control is needed which must however be more easily conducted by reason of the aforesaid wider lambda range. We can regard as "external" factors which influence the combustion air ratio λ (for a fixed air gas mixer setting): Composition of the (propellant) gas ($\Delta\lambda max \approx 7.2\%$), temperature difference between gas and air ($\Delta\lambda max \approx 2\%$), relative humidity in the induction air ($\Delta\lambda max \approx 1\%$) and the accuracy of the gas-air mixer ($\Delta\lambda max \approx 1.3\%$). In an extreme case, as the total of the estimates of maximum variation in one direction, as indicated in brackets, there may be a lambda shift of 11.5%, so that without any adjustment and instead of a present lambda value, it is possible to arrive at a lambda value at which the entire engine stalls or at which the lambda value drifts into the other direction so that the $NO_x$ pollutant emission increases, for example four times the admissible $NO_x$ pollutant emission level.

In the case of a gas engine which can be operated on a lean mixture, regulation via an oxygen probe which measures the $0_2$ content in the waste gas has already been suggested. However, in practice, such a manner of regulation, using an oxygen probe, presents many disadvantages. The characteristic curve of the oxygen probe is very flat in the lean-operation range, so that relatively large lambda variations result in only negligible variations in the probe output signals so that the accuracy of the control arrangement is negligible. In addition to the high costs of such an oxygen probe and the associated evaluating circuit, a further disadvantage resides in the fact that each oxygen probe has to be independently adjusted. Furthermore, it has been found that during prolonged operation of the gas engine, oxygen probes are susceptible to breakdown and a displacement of the probe characteristic can occur.

The object on which the invention is based resides in providing a favourably costed arrangement of the type mentioned at the outset, for regulating the combustion air mixture λ for a gas engine operating under lean conditions, by which, without using susceptible and expensive oxygen probes in the waste gas pipe, it is possible accurately to regulate the combustion air ratio even with varying engine output. Furthermore, when varying the heating value of the gas (at least without any measurement of the heating value), it is intended to allow regulation of the lambda value within the required lambda range.

SUMMARY OF THE INVENTION

According to the invention, this is achieved in that a pressure measuring means or manometer is provided to ascertain the mixture pressure obtaining the upstream of the inlet valves of the engine and of which the output is connected to an actual value input of the lambda regulator and in that there is in the lambda regulator a preferably programmable means of ascertaining a power-dependent desired value for the mixture pressure from the output signal measured and supplied by the power or output measuring means.

The invention is based on the idea that for a constant engine output at a constant engine speed and for a constant temperature of the mixture upstream of the inlet valves and for a constant heating value of the gas, the functional relationship between combustion air proportions λ and the relatively easily measured mixture pressure obtaining upstream of the inlet valves of the engine can be utilised in order to regulate the combustion air proportions by regulating the aforesaid mixture pressure. The mixture pressure is thereby regulated indirected via regulation of the combustion air proportions λ in the air-gas mixer, a leaning of the mixture (increasing of λ) causing, for example, an increase in the mixture pressure upstream of the inlet valves (if a constant engine output is required).

For each power-dependent desired value for the combustion air ratio λ which lies in the more central area of the lambda range defined between the power dependent stalling limit and the likewise power dependent $NO_x$ emission limit, there is for a specific engine output a corresponding likewise output dependent desired value for the said mixture value of the said mixture pressure to which the measured mixture pressure (actual value) is regulated via the air-gas mixer, using the above-described indirect regulation arrangement. Therefore, a lambda desired value curve (in the lambda range) and an associated mixture pressure desired value curve, ascertained initially be experiment for one type of engine exists, for example, as a function of the engine output, the clear correlation of the lambda desired value curve in relation to the engine output to a mixture pressure desired value curve over the engine output and vice versa initially presupposing a constant mixture temperature upstream of the inlet valves and a constant heating value of the gas. The effect of a variable mixture temperature and of an inconstant heating value will be explained later on. For the time being, let these values be regarded as constant.

The regulating arrangement functions in the following manner: For example, if for a specific engine output the associated lambda value is below the desired value (an increase in the proportion of $NO_x$ pollutants in the exhaust gas) and if therefore the mixture pressure upstream of the inlet valves is too low for the engine output obtaining, then the lambda regulator establishes a differential between the actual value of the mixture pressure (=control variable) fed via an actual value input, and the desired value of the mixture pressure ascertained in a lambda regulating arrangement from the output signal measured and supplied and the mixture pressure desired value curve which may, for example, be programmed into the apparatus, so that by means of the positioning device on the air-gas mixer, for example by increasing the air feed in an air by-pass, it is possible to lean down the mixture, in other words to achieve the desired increase in the lambda value which, of course, was below the desired value when the regulating process under consideration was starting.

Without regulating the output of the gas engine (throttle valve or the like), then with the said leaning of the mixture (=reduction in the mixture heating value), certainly the engine output will also drop. It is however important thereby that once the lambda regulation has been carried out, without regulating the output of the gas engine, it is true that the engine output may be different but the associated combustion air ratio will, however, be equal to the lambda desired value associated with this different engine output or alternatively the actual mixture pressure value will be equal to the desired value associated with this different engine output so that the engine setting will be appropriate.

In practice, the gas engine will be so constructed that downstream of the air-gas mixer, there will be in the induction line a power or output-controlling throttle device, for example a throttle valve. By virtue of this throttle device, the gas engine could be restored to the original or if required to a different engine output, for instance manually. At all times, the value for mixture pressure and thus the lambda value will always be appropriate to the engine output.

Apart from the availability or otherwise of an output regulating system, it is possible according to a preferred embodiment of the invention to envisage the throttle device being adjustable by a preferably adjusting regulating device and as a function of the engine output, and for the output adjustment undertaken via this regulating arrangement to respond more rapidly to variations in engine output than the adjustment in the combustion air proportions implemented via the lambda regulator. With such a gas engine regulating system, lambda regulation is in principle the same as in the case of unregulated gas engines, but if, for example, the mixture is made leaner by the lambda regulator, then straightaway and still while the leaning process is going on, the throttle valve will be opened and thus the output will be kept constant. Upon completion of the relatively slow (which is no disadvantage in the case of stationary gas engines) lambda regulation and thus regulation of the mixture pressure, the lambda value and the measured mixture pressure actual value will in any case suit the output which will have been maintained constant. Which output should be kept constant can be favourably adjusted.

In order to disengage the output control from the lambda regulation or control system via the mixture pressure, which likewise processes an output measurement signal and in order to prevent undesired uncontrollable vibration processes, the output regulator (throttle valve) responds far more quickly than it would to lambda regulation.

The already explained relationship between the lambda desired value curve in relation to engine output and the mixture pressure desired value curve in relation to engine output will inter alia also depend upon the mixture temperature upstream of the inlet valves, hitherto considered to be constant, so that in actual fact any mixture temperature will, for a given lambda desired value curve, correspond to a different mixture pressure desired value curve. The influence on the mixture pressure desired value of a variation in mixture temperature for a specific engine output is already known and covered by a formula and it can therefore be arithmetically compensated should there be an apparent need for a correction dependent upon the mixture temperature. To this end, a preferred feature of the invention resides in that the lambda regulator comprises a means for temperature compensation, of which the input is connected to a temperature measuring sensor for ascertaining the mixture temperature which exists upstream of the inlet valves of the engine and which sets a correction of the ascertained output dependent desired value for the mixture pressure fixed as a function of the temperature measuring sensor findings.

The said relationship between the lambda desired value curve in relation to engine output and the mixture pressure desired value curve in relation to engine output is not only temperature-dependent but is in principle also dependent upon the heating value of the gas, so that when there are variations in the heating value of the gas, either the mixture pressure desired value curve requires to be adjusted (which in practice, however, calls for complicated measurement of the heating value), or it must be taken into account that the lambda desired value curves and the mixture pressure desired value curves for comparison with the measured mixture pressure no longer correspond completely when there are variations in heating value, i.e. when there is a variation in heating value, a lambda value which is no longer on the lambda desired value curve may correspond to a mixture pressure regulated exactly for a specific engine output in accordance with the mixture pressure desired value curve. This is a result of the proportion of inert gas contained in the gas which has a low heating value. Fortunately, it has been demonstrated both experimentally and also theoretically that with exact correspondence of the lambda desired value curve to the mixture pressure desired value curve in the case of a gas with the highest possible heating value, the lambda value which is in fact adjusted is only slightly below the lambda desired value curve when the heating value of the gas has fallen and the mixture pressure is exactly on the mixture pressure desired value curve. Thus, by reason of the heating value reductions (even without a correction), failures or stalling are impossible. It is rather more true to say that the lambda value which becomes established with reductions in the heating value of the gas will tend towards the lower lambda range limit, the limit of the proportion of $NO_x$ pollutant content. With the heating value fluctuations which normally occur, the lambda value will, without any correction in the heating value fluctuation, indeed lie below the original lambda desired value curve (corresponding to the gas with the highest heating value), but still within the acceptable lambda range, particularly since in the case of a drop in the heating value of the gas, the stalling limit and the $NO_x$ pollutant emission limit and thus the entire relevant lambda range will also fall. Therefore, in the case of the arrangement according to the invention, and entirely in contrast to measurement with oxygen probes in the waste gas, where such measurement is absolutely necessary, any special consideration (measurement) of the heating value fluctuations of the gas may be dispensed with, which constitutes a further vital advantage of the regulating arrangement according to the invention.

During lean-mixture operation, above all the $NO_x$ pollutant fractions are kept to the minimum. Although the CO— and $C_n H_m$ pollutant fractions are not high either, it is possible in order to satisfy the most demanding standards, additionally to provide an uncomplicated and rugged oxidation catalyst in the exhaust gas line.

The invention will be explained in greater detail hereinafter with reference to an embodiment shown in the accompanying drawings.

BRIEF DESCRIPTION OF THE DRAWINGS

In the drawings,

FIG. 1 is a diagrammatic block diagram of an embodiment of the arrangement according to the invention while FIG. 2 shows a typical graph of the stalling limit of the $NO_x$ pollutant emission limit, the broken lines representing the lambda desired value curve in relation to output while

DESCRIPTION OF THE PREFERRED EMBODIMENTS

Figure 1:
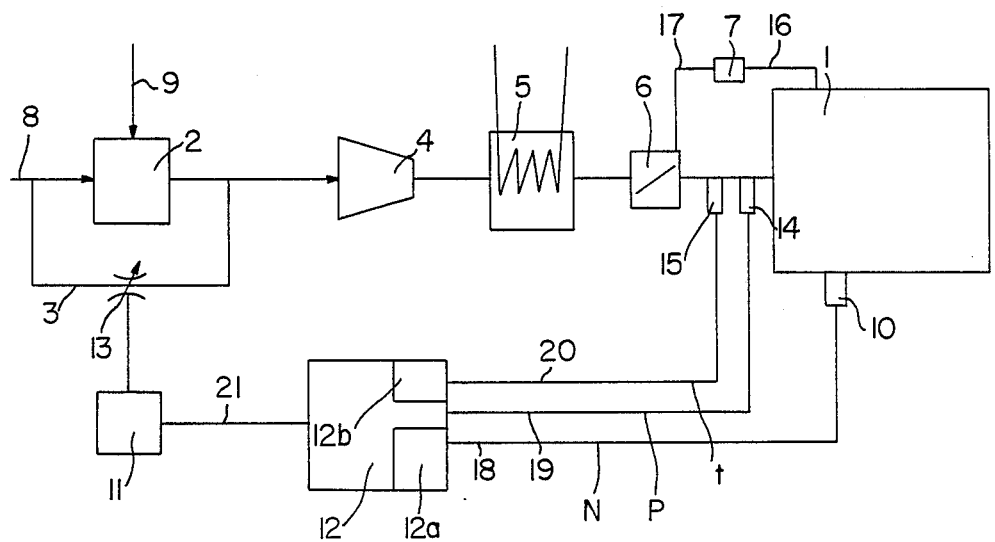

The arrangement shown in FIG. 1 serves to regulate the air to fuel ratio which is known in the art to be represented by the greek letter lambda ($\lambda$), and for the per se known regulation of the output of the gas engine 1 which runs substantially at a constant speed. A mixture of gas and air having a predetermined air to fuel ratio, prepared by the substantially rigidly adjusted air-gas mixer 2 (air feed 8, gas feed 9) and the by-pass line 3 which serves as a positioning means is fed to the gas engine 1 via a compressor 4, a mixture cooler 5 and lastly a throttle valve 6. The gas engine 1 is output regulated via the rapidly responding adjusting regulating device 7 and the throttle valve 6, the throttle valve 6 being, for a desired applied maximum output from the gas engine and for optimum gas quality, ideally not fully opened so that even if there is a drop in the heating value of the gas, this desired maximum output can be achieved by opening the throttle valve 6. As shown in FIG. 1, there is an input line 16 traveling from the gas engine 1 into the right side of the regulating device 7. Also shown in the figure, is a left output line 17 which travels from the regulating device 7 into the throttle valve 6. Using a simple electronic circuit which is known in the art, the regulating device 7 monitors the engine power of the gas engine 1 through the right input line 16. Then, via the left output line 17, the regulating device 7 adjusts the throttle valve 6 in order to maintain a constant engine power output value which has been pre-selected.

According to the invention, lambda regulation takes place via the output dependent regulation of the mixture pressure obtaining upstream of the engine inlet valves, and a specific lambda value corresponds exactly to any engine output (for a constant gas heating value and a constant mixture temperature). Pressure regulation to a specific engine output ascertained by the output measuring device 10 takes place indirectly by regulation of the air to fuel ratio by the positioning valve 13 actuated by the positioning device 11 of the lambda regulator 12 and disposed in the air by-pass line 3 which is parallel with the air gas mixer 2. The mixture pressure actual value required to regulate the pressure to an output dependent desired value is asscertained by the pressure meter or manometer 14, the output of which is connected to an actual value input of the lambda regulator 12. The output dependent mixture pressure desired value curve (for a fixed mixture temperature and, for example, corresponding to the highest gas heating value) is programmed into the programmable device 12a which ascertaines a mixture pressure desired value for any engine output N. As can be seen from FIG. 3, there is a virtually linear relationship between the mixture pressure desired value $p_{soll}$ and the engine output N.

Figure 2:
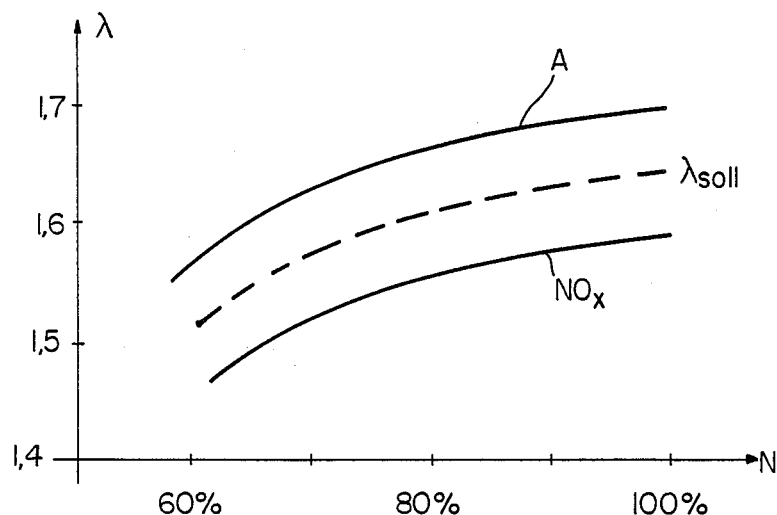

This mixture pressure desired value curve in relation to the output N corresponds for a constant mixture temperature t and a constant heating value of the gas exactly to a lambda desired value curve in relation to output such as is illustrated in broken lines in FIG. 2. It is substantially on this relationship of the two desired value curves that the invention is based.

Figure 3:
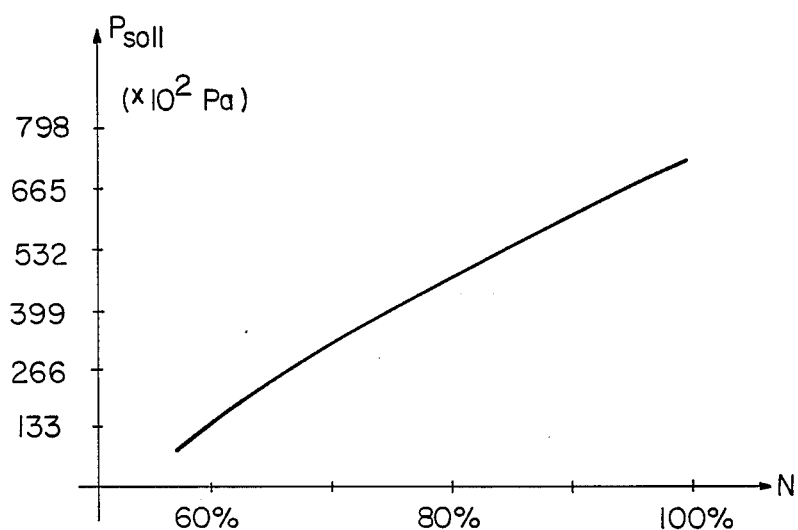
FIG. 3 shows in relation to output the mixture pressure desired value curve relevant to the lambda desired value curve shown in FIG. 1, for a fixed mixture temperature and the highest heating value encountered.

The output percentage figures given in FIGS. 2 and 3 relate to a desired standard output from the gas engine (which is achieved when a generator is operating under full load). In FIG. 2, reference A denotes the output dependent stalling limit above which the mixture is too lean. The lower limit represents the required $NO_x$ pollutant emission limit below which the $NO_x$ pollutant emission is too high. Between the curves A and $NO_x$ in FIG. 2 lies the lambda range, in the middle of which is the dash-dotted lambda desired value curve.

By regulating the mixture pressure actual value p to the output dependent desired value $p_{soll}$ according to FIG. 3, it is possible (for a fixed temperature of the mixture and a fixed heating value of the gas) also to have the air to fuel ratio (actual value) located on the lambda desired value curve shown in FIG. 2. This regulation takes place at the direction of the lambda controller 12 which, as shown in FIG. 2, is constantly being supplied with information regarding the power output N of the engine 1, the combustion mixture temperature t, and the combustion mixture pressure p, from input lines 18, 19, and 20 respectively. Then based on this information, through a signal sent through output line 21, the lambda regulator 12 directs the positioning device 11 to alter the positioning valve 13 so that the combustion mixture pressure corresponds to $p_{soll}$ as calculated by the programmable device 12a. Information received through input lines 18, 19, and 20, and sent out through output line 21, by the lambda controller 12 is processed by several electronic circuits which need not be illustrated or described in more detail as they will be readily apparent to those skilled in the art.

The way the arrangement functions can be explained with reference to an example:

Let it be assumed that the temperature t of the mixture ascertained by the temperature measuring sensor and the heating value of the gas are constant. If, then, the lambda value for a predetermined engine output adjusted at the regulating device 7 falls (mixture over-rich), then, without any adjustment of the output at the throttle valve, this would result in an increase in output. The rapid-response regulating device 7 certainly maintains the output constant in the present embodiment. With a low lambda value, therefore, a mixture pressure value p may for this output be too low at the pressure gauge 14. The lambda regulator 12 discovers that the actual value p of the mixture pressure for this engine output is below the desired value $p_{soll}$ (FIG. 3) and, by opening the adjusting valve 13, it causes a leaning down of the mixture (increasing). Therefore, the actual value of the mixture pressure p also increases until $p_{soll}$ is reached. The excessively low lambda value is corrected and running of the gas engine is now optimum.

It is pointed out that output adjustment via the throttle valve or the like does not have any essential influence on the functioning of the lambda regulating arrangement according to the invention. Without adjusting the output, it is true that the engine output will vary readily, which may be of minimal importance in the case of pump engines, but certainly every engine output will have a matching mixture pressure and so a lambda value will be adjusted on the lambda desired value curve.

The effect of the varying mixture temperature is offset by the arrangement 12b within the lambda regulating arrangement 12 in that as a function of the mixture temperature p ascertained by the temperature sensor 15, so a corrected mixture pressure desired value for the output at the time is ascertained and then the actual value of the mixture pressure is compared with it. Therefore, the curve shown in FIG. 3 corresponds to the lambda desired value curve in FIG. 2 but only for one mixture temperature.

In principle, the regulating arrangement according to the invention can also be used for induction engines in which, then, the compressor 4 and the mixture cooler 5 shown in FIG. 1 will be unnecessary.

We claim:

1. An internal combustion engine including a system for adjusting the pressure and varying the air to fuel ratio of a combustion mixture being supplied to the engine through an induction line in communication with inlet valves of the engine, comprising:
   an air-gas mixer in communication with the induction line for receiving separated supplies of air and gas, and mixing said separated supplies of air and gas to form the combustion mixture, and for delivering said combustion mixture to the induction line;
   an air supply line in communication with said air-gas mixer for delivering the supply of air to said air-gas mixer;
   a gas supply line in communication with said air-gas mixer for delivering the supply of gas to said air-gas mixer;
   an air by-pass line for allowing a portion of air from said air supply line to circumvent said air-gas mixer and flow directly into said induction line to increase the pressure and the air to fuel ratio of the combustion mixture in the induction line;
   a positioning valve located in said air by-pass line for regulating the portion of air which is allowed to flow through said air by-pass line;
   a valve positioning device for adjusting said positioning valve;
   a means for measuring pressure, located in the induction line upstream of the inlet valves of the engine, for monitoring the pressure of the combustion mixture to determine the air to fuel ratio of the combustion mixture being supplied to the engine;
   an output measuring device for measuring the power output of the engine;
   an air to fuel ratio controller for receiving a signal from said output measuring device indicating the power output of the engine and also for receiving a signal from said pressure measuring means indicating the pressure of the combustion mixture being supplied to the engine, said air to fuel ratio controller comprising a means for determining an optimum value for the pressure of the combustion mixture needed to generate an ideal air to fuel ratio based on the power output of the engine and a means for signaling said valve positioning device to adjust said positioning valve so that the portion of air being allowed to circumvent the air-gas mixer results in the pressure of the combustion mixture being delivered to the engine being equal to said optimum value.

2. The engine according to claim 1, wherein said air to fuel ratio controller further comprises a temperature measuring sensor and a device for temperature compensation, with an input which is connected to the temperature measuring sensor for detecting the combustion mixture temperature prevailing upstream of the inlet valves of the engine and which establishes the output dependent optimum value for the combustion mixture pressure as a function of the temperature established by the temperature measuring sensor.

3. The engine according to claim 1, wherein, in the induction line, following the gas-air mixer there is an output controlling throttling device, for example a throttle valve.

4. The engine according to claim 3, wherein the throttling device can be set via a preferably adjustable regulating device as a function of the engine power output, and wherein the output adjustment undertaken via this regulating device responds more rapidly to fluctuations in engine output than does the air to fuel ratio controller.

5. The engine according to claim 1, wherein provided for the air-gas mixer there is an air by-pass line in which is disposed a positioning valve for controlling the portion of air being supplied to the combustion mixture and which can be actuated by the position device which is controlled by air to fuel ratio controller.

6. The engine according to claim 1, further comprising an exhaust gas pipe in which an oxidation catalyst is disposed.

7. The engine according to claim 1, wherein a mixture compressor is arranged in the induction line between said air-gas mixer and the gas engine.

8. The engine according to claim 1 wherein said means for determining said ideal value of the air to fuel ratio based on the power output of the gas engine is programmable.

9. An internal combustion engine including a system for regulating the air to fuel ratio of a combustion mixture being supplied to the engine through an induction line in communication with inlet valves of the engine comprising:
an adjustable air-gas mixer in communication with the induction line for receiving separated supplies of air and gas, and mixing said separted supplies of air and gas to form the combustion mixture, and for delivering said combustion mixture in the induction line;
an air supply line in communication with said air-gas mixer for delivering the supply of air to said air-gas mixer;
a gas supply line in communication with said air-gas mixer for delivering the supply of gas to said air gas-mixer;
an adjusting means for adjusting the air gas-mixer in order to vary the air to fuel ratio of the combustion mixture being delivered to the induction line;
a means for measuring pressure, located in the induction line upstream of the inlet valves of the engine, for monitoring the pressure of the combustion mixture;
a power output measuring device for measuring the power output of the engine;
an air to fuel ratio controller for receiving a signal from said output measuring device indicating the power output of the engine and also for receiving a signal from said means for measuring pressure indicating the pressure of the combustion mixture being supplied to the engine, and air to fuel ratio controller comprising, a means for determining an optimum value for the pressure of the combustion mixture corresponding to an ideal air to fuel ratio based on the power output of the engine, and a means for signaling said adjusting means for adjusting the air-gas mixer in order to change the air to fuel ratio of the combustion mixture, when a deviation is detected of the pressure of the combustion mixture being supplied to the engine from said optimum value of the pressure of the combustion mixture, as determined by said air to fuel ratio controller based on the power output of the engine, until the pressure of the combustion mixture, as monitored by the pressure measuring means, and the optimum value of the pressure, which is power-dependent, coincide.

10. A method for adjusting the pressure and varying the air to fuel ratio of a combustion mixture being supplied to an internal combustion engine through inlet valves in the engine comprising:
supplying fuel to a gas mixer in communication with an induction line of the gas engine;
supplying air to the gas mixer in communication with the induction line of the gas engine;
mixing the supplied air and fuel in the gas mixer to form the combustion mixture;
delivering the combustion mixture to the engine induction line;
providing a means for adjusting the gas mixer to vary the air to fuel ratio of the combustion mixture being supplied to the induction line;
monitoring the pressure of the combustion mixture upstream of the inlet valves of the engine;
monitoring the power output of the engine;
calculating an optimum air to fuel ratio of the combustion mixture based on the engine power output;
calculating an optimum pressure of the combustion mixture needed to result in the combustion mixture having the optimum air to fuel ratio;
adjusting the gas mixer to change the air to fuel ratio of the combustion mixture so that the pressure of the combustion mixture being supplied to the engine is equal to said optimum value.

11. The method as set forth in claim 11 further comprising the step of:
compressing the combustion mixture in the induction line upstream of the gas engine.

12. The method as set forth in claim 11 further comprising the step of:
cooling the combustion mixture in the induction line upstream of the gas engine.

13. The method as set forth in claim 11 further comprising the steps of:
monitoring the temperature of the combustion mixture upstream of the inlet valves of the engine; and
compensating for the pressure differences due to the monitored temperature when calculating the optimum pressure of the combustion mixture needed to generate an optimum air to fuel ratio.

* * * * *